United States Statutory Invention Registration [19]

[11] Reg. Number: H573

Deeley [43] Published: Feb. 7, 1989

[54] SEALING OF PITS

[75] Inventor: George M. Deeley, Houston, Tex.

[73] Assignee: Shell Oil Company, Houston, Tex.

[21] Appl. No.: 126,549

[22] Filed: Nov. 30, 1987

[51] Int. Cl.[4] ..... E02D 3/00
[52] U.S. Cl. ..... 405/270
[58] Field of Search ..... 405/128, 263, 264, 270

[56] References Cited

U.S. PATENT DOCUMENTS

| | | | |
|---|---|---|---|
| 1,943,584 | 3/1929 | Cross | 405/263 X |
| 2,159,954 | 5/1939 | Powell | 405/270 |
| 3,196,619 | 7/1965 | Shock | 405/263 X |
| 3,466,873 | 9/1969 | Present | 405/128 |
| 3,774,402 | 11/1973 | Muzychenko et al. | 405/263 |
| 4,084,382 | 4/1978 | Clem | 405/270 X |
| 4,149,968 | 4/1979 | Kupiec et al. | 405/128 X |
| 4,194,855 | 3/1980 | Egger | 405/128 |
| 4,209,568 | 6/1980 | Clem | 405/263 X |
| 4,344,722 | 8/1982 | Blais | 405/128 X |
| 4,534,925 | 8/1985 | Harriett | 405/270 X |

FOREIGN PATENT DOCUMENTS

| | | | |
|---|---|---|---|
| 2430371 | 1/1976 | Fed. Rep. of Germany | 405/128 |

OTHER PUBLICATIONS

"How to Select an Effective Waste Pit Liner", Aston Hinds et al, Drilling, Jan./Feb. 1987.

"Hydraulic Conductivity and Leachability of Waste Drilling Fluids", G. M. Deeley et al, Ninth Annular Energy Sources Technology Conference, New Orleans, La., Feb. 23–27, 1986.

*Primary Examiner*—Deborah L. Kyle
*Assistant Examiner*—Michael J. Carone

[57] ABSTRACT

The primary purpose of the present invention is to preseal a pit by adding a specially designed sealing material to the pit bottom prior to putting other materials, e.g., waste material, into the pit, e.g., a disposal pit.

In accordance with the present invention a method for sealing the bottom of a pit is provided to minimize leakage from the pit comprising mixing a sealing material preferably an admixed soil liner in combination with bentonite clay or a bentonite/polymer (e.g., polyurethane-polymure) mixure mixed with native soil, in a fluid mixing tank, such as far as for preparing drilling mud for a well, connecting a pump and hose to the fluid mixing tank, dispensing a layer of the sealing material from the fluid mixing tank through the pump and hose and onto the bottom and sides of the pit, e.g., a disposal pit, and allowing the dispensed layer of sealing material to seal the bottom and sides of the pit. Preferably, the method includes removing materials, e.g., waste materials, from the pit after use of the pit is concluded; mixing a second batch of sealing material in the fluid mixing tank, dispensing a layer of the sealing material on top of the material remaining in the pit, and allowing the dispensed layer of the sealing material to seal the top of the pit.

7 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SEALING OF PITS

BACKGROUND OF THE INVENTION

Earthen pits are in widespread use in industry. These pits are useful for containing waste materials, cooling water, process brines, and other materials. Ground water pollutants from such pits potentially include soluble components present in the contained materials. For example, drilling fluid disposal pits have been found to contain significant levels of sodium, sulfate, chlorate, arsenic, barium, chromium, lead, zinc, and total organic carbon. The transport and fate of these constituents in the subsurface may involve several processes (adsorption, microbial degradation, ion exchange, chemical precipitation, particulate transport, and others). It is influenced by several variables (constituent type, soil type, oxidation-reduction conditions, pH and other environmental factors).

The rate of release of soluble chemical constituents from pits is largely controlled by the permeability of underlying strata or liner materials. Liners can be formed from man-made materials, natural clays, or by exploiting the sealing properties of the waste drilling muds themselves. Such liners are needed to ensure the integrity of the earthen pit.

Of critical importance is the necessity to construct the pit and liner to prevent leakage of pit contents and consequent potential contamination of the surrounding environment. Such liners are classifiable into membrane liners, recompacted soil liners, and admixed soil liners.

Membrane liners usually are constructed of fabric reinforced plastic. Important advantages of membrane liners include their ability to contain a wide variety of fluids and their high resistance to chemical and bacterial deterioration. Disadvantages include vulnerability to ozone and ultraviolet deterioration. Also, membrane liners are comparatively susceptible to laceration, abrasion and puncture, as well as cracking and creasing at low temperatures and to distortion at high temperatures. Membrane liners do not have the ability to absorb or attenuate potential pollutants that could leach if a puncture should occur.

Clay admixtures and recompacted soils are the most frequently used liner materials in oilfield pit construction. Recompacted soil liners are constructed by compacting native soils to reduce or eliminate pores which allow leaching. Such liners, unless carefully constructed, frequently are not effective, however, to prevent penetration and/or overflow of the liner by the pollutant and are relatively expensive to install. Accordingly, the art is in need of a liner for pits, such as oilfield disposal pits, which is capable of containing pollutants without failures and which is relatively inexpensive to install.

Applicant is not aware of any prior art which, in his judgment as one skilled in the art, would anticipate or render obvious the present invention; however, for the purposes of fully developing the background of the invention, and establishing the state of the requisite art, the following art is set forth: "How to Select an Effective Waste Pit Liner", Aston A. Hinds et al, *Drilling*, Jan./Feb. 1987; "Hydraulic Conductivity and Leachability of Waste Drilling Fluids", G. M. Deeley et al, *Ninth Annual Energy Sources Technology Conference*, New Orleans, La., Feb. 23–27, 1986.

SUMMARY OF THE INVENTION

The primary purpose of the present invention is to preseal a pit by adding a specially designed sealing material to the pit bottom prior to putting other materials, e.g., waste material, into the pit, e.g., a disposal pit.

In accordance with the present invention a method for sealing the bottom of a pit is provided to minimize leakage from the pit comprising mixing a sealing material in a fluid mixing tank, such as for preparing drilling mud for a well, connecting a pump and hose to the fluid mixing tank, dispensing a layer of the sealing material from the fluid mixing tank through the pump and hose and onto the bottom and sides of the pit, e.g., a disposal pit, and allowing the dispensed layer of sealing material to seal the bottom and sides of the pit. Preferably, the method includes removing materials, e.g., waste materials, from the pit after use of the pit is concluded; mixing a second batch of sealing material in the fluid mixing tank, dispensing a layer of the sealing material on top of the material remaining in the pit, and allowing the dispensed layer of the sealing material to seal the top of the pit.

Other purposes, distinctions over the art, advantages and features of the invention will be apparent to one skilled in the art upon review of the following.

DESCRIPTION OF PREFERRED EMBODIMENT

Figure 1:
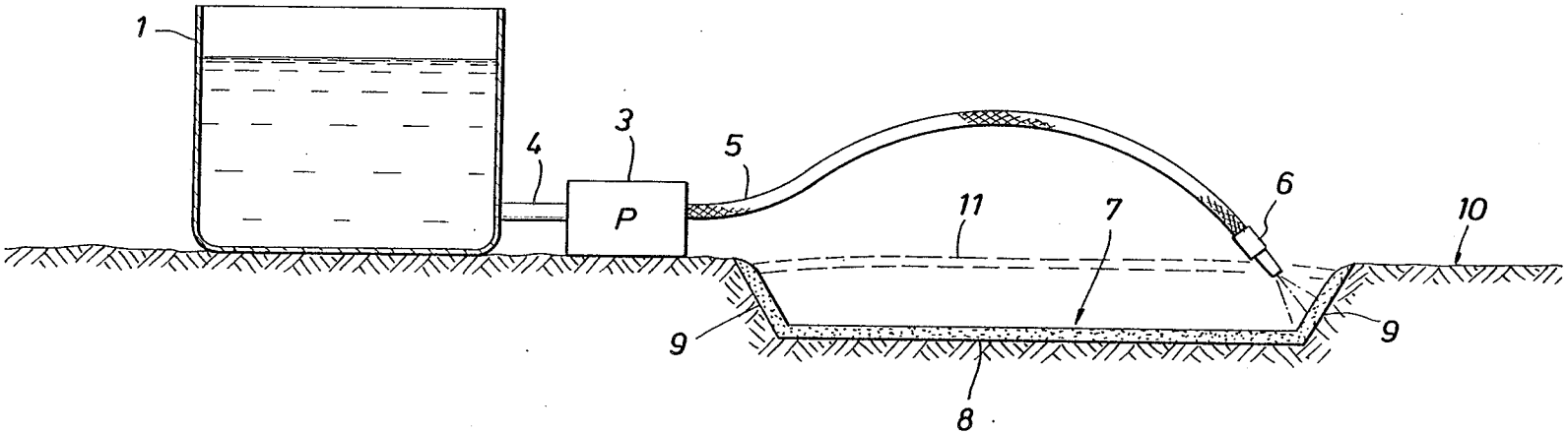
FIG. 1 shows the technique for distributing a sealant into a pit.

In accordance with the invention, an admixed soil liner preferably is utilized in combination with bentonite clay or a bentonite/polymer (e.g., polyurethane-polyurea) mixture mixed with native soil. The admixed soil liner is sealed by a chemical and physical process in which the bentonite/polymer additive swells and locks into soil pores for a better seal. Use of the soil liner depends especially on the availability of suitable soil material. When a pit construction site is located in an area with low permeability soil, the cost of constructing a recompacted soil liner is lowered because of reduced or eliminated transportation of suitable borrowed material from other locations. Quality of this type of liner varies greatly due to soil makeup. However, seepage through highly permeable soils is reduced by adding natural or polymer treated bentonite to the native soil. The resulting admixed soil layer has the advantages of self-sealing capabilities, inertness of the additives to degradation and leaching, imperviousness to liquid flow, and low cost installation. Further, such admixed soil pit liners require less soil than a native soil liner, and the additive mixture can be adjusted for greater compatibility with the materials to be sealed. When the admixed soil liner seal is applied with available on-site mixing equipment, e.g., mud mixing equipment as at a well drilling location, and the disposal pit is subsequently capped after usage, a truly superior pit seal results, at a greatly reduced cost.

Having thus generally described the present invention, as well as its numerous advantages over the art, the following is a more detailed description thereof, given in accordance with specific reference to the drawings.

As shown in FIG. 1, a fluid mixing tank 1, such as is typically used in connection with an oil or gas well to mix drilling muds, is used to prepare a sealing material such as an admixed soil liner as above described. The tank is connected with a pump 3 which in turn is connected via pipes or conduits 4 and 5 to a nozzle 6. From the nozzle 6 the sealing layer 7 is sprayed onto the bottom 8 and sides 9 of a pit, e.g. a disposal pit, which has been dug into the earth 10. After use of the pit is completed, and it is filled with waste materials, e.g., drilling fluids, such are removed, and a second batch of sealing material is mixed in the fluid mixing tank. Then a layer 11 of sealing material (shown in phantom) is dispensed on top of the waste material, e.g., drilling mud, remaining in the pit and allowed to seal the top of the pit. Alternatively, the waste material, e.g., drilling mud, in the pit may be mixed to form a homogeneous mixture, without breaking the bottom and side sealing material, prior to adding the top sealing material.

An advantage of this invention resides in the small change in present operating equipment and procedures required to put it into practice. All that is required is the pump and a hose or pipe. For example, a mud specialist at the site of an oil/gas well can determine the proper sealing characteristics required of the liner to be used for a disposal pit. All mixing thus may be done in presently available equipment.

The foregoing description of the invention is merely intended to be explanatory thereof, and various changes in the details of the described method and apparatus may be made within the scope of the appended claims without departing from the spirit of the invention.

What is claimed is:

1. A method for sealing the bottom of a pit to minimize leakage from the pit, comprising:

mixing a sealing material in a fluid mixing tank;

connecting a pump and hose to the fluid mixing tank;

dispensing a layer of the sealing material from the fluid mixing tank through the pump and hose and onto the bottom and sides of the pit; and allowing the dispensed layer of sealing material to seal the bottom and sides of the pit.

2. The method of claim 1 wherein the sealing material is a mixture of bentonite clay, sand, polymer and water.

3. The method of claim 1 including:

mixing a second batch of sealing material in the fluid mixing tank;

dispensing a layer of the sealing material on top of the material added to the pit; and allowing the dispensed layer of the sealing material to seal the top of the pit.

4. The method of claim 3 including mixing the material in the pit to form a homogeneous mixture, without breaking the bottom and side sealing material, prior to adding the top sealing material.

5. The method of claim 1 including mixing clay and bentonite to form the sealing material.

6. The method of claim 1 wherein the pit is a disposal pit used to contain drilling mud and fluids containing cuttings from a well.

7. The method of claim 3 wherein the pit is a disposal pit for drilling fluids and including the step of removing the drilling fluids from the disposal pit after use of the pit is concluded.

* * * * *